(12) United States Patent
Dede et al.

(10) Patent No.: US 11,665,788 B1
(45) Date of Patent: May 30, 2023

(54) TRANSPARENT DISPLAY SYSTEMS AND METHODS

(71) Applicant: Toyota Motor Engineering & Manufacturing North America, Inc., Plano, TX (US)

(72) Inventors: Ercan Mehmet Dede, Ann Arbor, MI (US); Sean P. Rodrigues, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/854,485

(22) Filed: Jun. 30, 2022

(51) Int. Cl.
*H05B 3/86* (2006.01)
*B60K 35/00* (2006.01)

(52) U.S. Cl.
CPC .............. *H05B 3/86* (2013.01); *B60K 35/00* (2013.01); *B60K 2370/1438* (2019.05); *B60K 2370/35* (2019.05); *B60K 2370/785* (2019.05)

(58) Field of Classification Search
CPC ...... H05B 3/86; B60K 35/00; B60K 2370/35; B60K 2370/785; B60K 2370/1438
See application file for complete search history.

(56) References Cited

U.S. PATENT DOCUMENTS

| | | | | |
|---|---|---|---|---|
| 4,820,902 | A * | 4/1989 | Cillery | B32B 17/10036 219/547 |
| 5,162,191 | A * | 11/1992 | Sedberry | B41J 2/355 430/319 |
| 7,671,851 | B1 * | 3/2010 | Pryor | G06F 3/0312 345/184 |
| 10,466,392 | B1 * | 11/2019 | Melcher | G02F 1/133555 |
| 11,130,314 | B2 | 9/2021 | Yoon et al. | |
| 11,168,937 | B2 | 11/2021 | Lee et al. | |
| 2002/0159270 | A1 * | 10/2002 | Lynam | H04N 5/374 362/492 |
| 2003/0227663 | A1 * | 12/2003 | Agrawal | G02F 1/161 359/265 |
| 2005/0064936 | A1 * | 3/2005 | Pryor | A63F 7/027 463/36 |
| 2006/0255960 | A1 * | 11/2006 | Uken | B60R 1/1207 340/815.4 |
| 2008/0143338 | A1 * | 6/2008 | Sekine | G01R 31/52 324/503 |
| 2008/0170982 | A1 * | 7/2008 | Zhang | H01L 51/444 423/447.3 |
| 2010/0059494 | A1 * | 3/2010 | Keite-Telgenbuscher | H05B 3/86 219/548 |

(Continued)

FOREIGN PATENT DOCUMENTS

KR  20190045433 A  5/2019

*Primary Examiner* — Christopher E Leiby
(74) *Attorney, Agent, or Firm* — Christopher G. Darrow; Darrow Mustafa PC (57) ABSTRACT

A transparent display system includes a transparent display, a touch-sensitive layer, and a heater layer. The touch-sensitive layer is connected to the transparent display and is configured to detect a touch-based input to the transparent display. The heater layer is connected to the transparent display and includes a trace array and one or more electrodes operable to activate the trace array to generate heat to heat at least a portion of the transparent display based on the touch-based input.

20 Claims, 5 Drawing Sheets

(56) References Cited

U.S. PATENT DOCUMENTS

| | | | |
|---|---|---|---|
| 2013/0028503 A1* | 1/2013 | Wakui | H01B 13/003 |
| | | | 382/141 |
| 2013/0166146 A1* | 6/2013 | Tanaka | B60K 35/00 |
| | | | 701/36 |
| 2014/0111711 A1* | 4/2014 | Iwami | B32B 15/02 |
| | | | 349/12 |
| 2016/0236612 A1* | 8/2016 | Caron | G09F 27/005 |
| 2017/0103697 A1 | 4/2017 | Kawashima et al. | |
| 2017/0118800 A1* | 4/2017 | Baba | H05B 3/20 |
| 2018/0094471 A1* | 4/2018 | Mitchell | E05F 15/73 |
| 2018/0297331 A1* | 10/2018 | Gahagan | B60J 1/001 |
| 2019/0324274 A1 | 10/2019 | Kalinowski et al. | |
| 2020/0060041 A1 | 2/2020 | Wang et al. | |
| 2021/0054691 A1* | 2/2021 | Ramirez | B60K 35/00 |
| 2021/0221228 A1* | 7/2021 | Barry | B60K 35/00 |
| 2021/0323410 A1* | 10/2021 | Huber | G02B 5/30 |
| 2021/0389615 A1 | 12/2021 | Rodrigues | |

* cited by examiner

TRANSPARENT DISPLAY SYSTEMS AND METHODS

TECHNICAL FIELD

The embodiments disclosed herein relate to displays and, more particularly, to systems and methods for a transparent display system.

BACKGROUND

Display devices are widely used in various applications, for example, computers, mobile phones, televisions, etc. Many display devices have temperature ranges suitable for normal use in most indoor and/or outdoor environments. For example, liquid crystal displays (LCDs) may have a storing temperature range from about −4° F. to 140° F., and an operating temperature range of about 32° F. to 122° F. However, in some arrangements where it may be desirable to have display devices be transparent, these temperature ranges may raise concerns with respect to functionality in cold or foggy environments.

SUMMARY

Disclosed herein are heater layer-based embodiments of a transparent display system, a vehicular body structure including a transparent display system forming at least a portion of a window, and a method for heating a window including a transparent display system forming at least a portion of a window.

In one aspect, a transparent display system is disclosed. The transparent display system includes a transparent display, a touch-sensitive layer, and a heater layer. The touch-sensitive layer is connected to the transparent display and is configured to detect a touch-based input to the transparent display. The heater layer is connected to the transparent display and includes a trace array and one or more electrodes operable to activate the trace array to generate heat to heat at least a portion of the transparent display based on the touch-based input.

In another aspect, a vehicular body structure is disclosed. The vehicular body structure includes a window frame, a window, and a transparent display system. The window is configured for installation in the window frame and the transparent display system forms at least a portion of the window. The transparent display system includes a transparent display, a touch-sensitive layer, and a heater layer. The touch-sensitive layer is connected to the transparent display and is configured to detect a touch-based input to the transparent display. The heater layer is connected to the transparent display includes a trace array and one or more electrodes operable to activate the trace array to generate heat to heat at least a portion of the transparent display based on the touch-based input.

In yet another aspect, a method of heating a window is disclosed. The window includes a transparent display system forming at least a portion of the window. The transparent display system includes a transparent display, a touch-sensitive layer, and a heater layer. The touch-sensitive layer and the heater layer are connected to the transparent display. The heater layer includes a trace array and one or more electrodes. The method includes detecting, by the touch-sensitive layer, a touch-based input to the transparent display. The method also includes operating, based on the touch-based input, the one or more electrodes to activate the trace array to heat at least a portion of the transparent display.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a transparent display system that advantageously ensures functionality in cold and/or foggy environments that may cause frost or condensation on a transparent display. The transparent display system includes a transparent display, a touch-sensitive layer, and a heater layer. The touch-sensitive layer is connected to the transparent display and is configured to detect a touch-based input to the transparent display. The heater layer is connected to the transparent display and includes a trace array and one or more electrodes operable to activate the trace array to generate heat to heat at least a portion of the transparent display based on the touch-based input. Accordingly, in some arrangements, the transparent display system may form at least a portion of a window, such as a building window, a vehicle window, etc., and may be used to defrost or defog at least a portion of the window.

Figure 1:
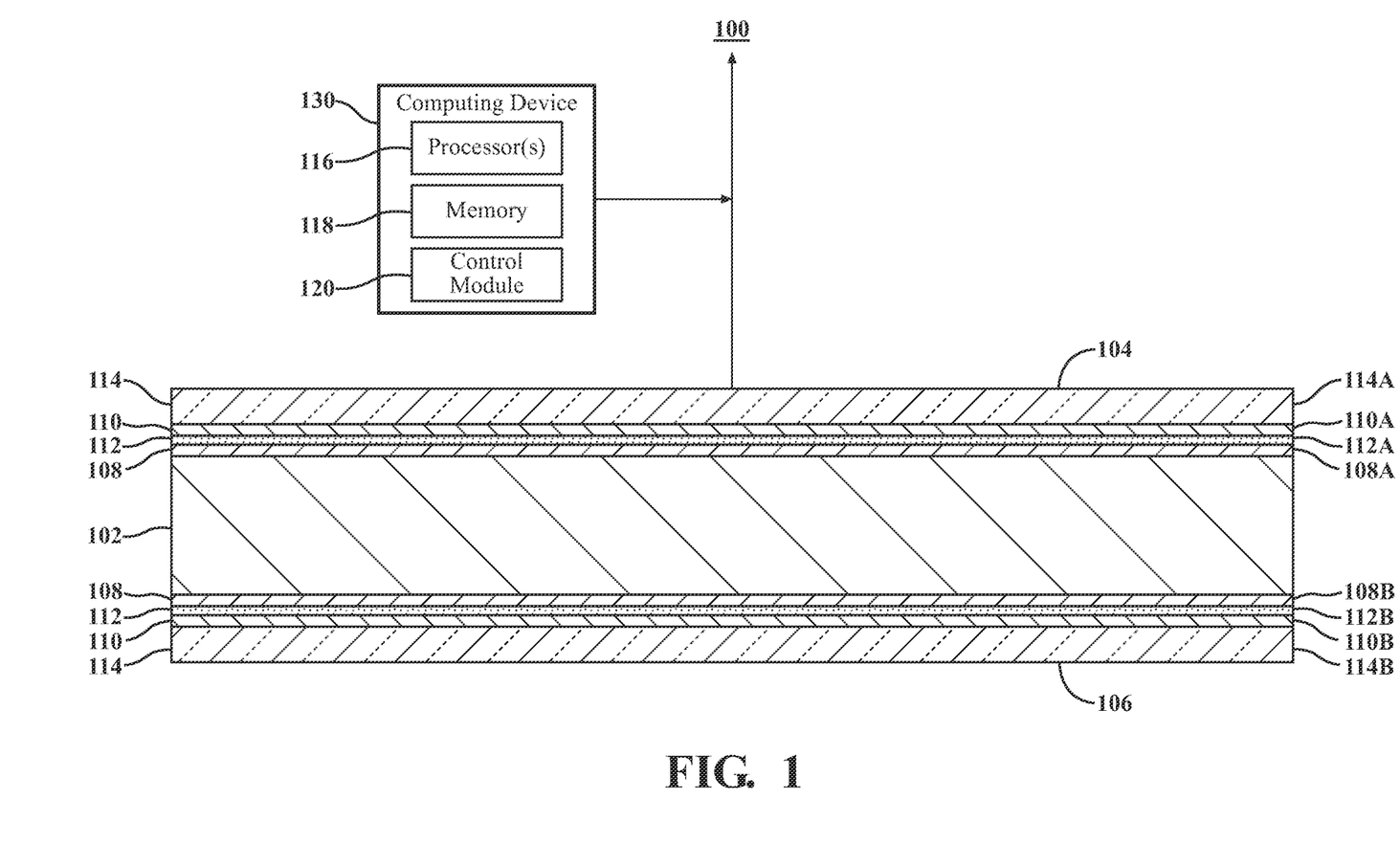
FIG. 1 is an example of a transparent display system including a transparent display, one or more touch-sensitive layers, and one or more heater layers.

Referring now to FIG. 1, an example of a transparent display system 100 is shown. Among other components, the transparent display system 100 includes a transparent display 102 which can be configured to display content, such as text, images, and/or video. The transparent display 102 includes a first side 104 and a second side 106. In the illustrated dual-sided implementation, the transparent display 102 can be configured to display content on both sides of the transparent display 102. In other implementations, the transparent display 102 can be configured to display content on only one side of the transparent display 102, for example, on the first side 104 or on the second side 106. One or more of the components of the transparent display system 100 can be substantially transparent such that a person can see through the transparent display system 100. As described in further detail below, one or more components of the transparent display system 100 can be formed using materials that are substantially transparent or clear and/or using materials formed at a small enough scale such that they have insignificant light absorption. Accordingly, the transparent display system 100 can be used in connection with a screen, such as a laptop screen, a mobile device screen etc., or a window, such as a building window, a vehicle window, etc. For example, the transparent display system 100 can form at least a portion of a building window or a vehicle window.

The transparent display system 100 also includes one or more the touch-sensitive layers 108. The touch-sensitive layer(s) 108 are configured to detect a touch-based input from a user of the transparent display 102. For example, the touch-sensitive layer(s) 108 are configured to detect a user's finger or hand when placed on the transparent display system 100. The touch-sensitive layer(s) 108 can be any suitable kind of touch-sensitive layers. For example, the touch-sensitive layer(s) 108 can be resistive touch layer(s), capacitive touch layer(s), etc. By detecting a touch-based input to the transparent display system 100, the touch-sensitive layer(s) 108 can be configured to activate, deactivate, or otherwise control the content displayed on the transparent display 102 according to the touch-based input. The touch-sensitive layer(s) 108 can also be configured to activate, deactivate, or otherwise directly or indirectly control other components of the transparent display system 100 according to the touch-based input, as described in further detail below.

The touch-sensitive layer(s) 108 may be connected to the transparent display 102 external to the transparent display 102. For example, the touch-sensitive layer(s) 108 may be connected to the first side 104 and/or the second side 106. The touch-sensitive layer(s) 108 may be connected to the transparent display 102 under one or more components of the transparent display system 100, or the touch-sensitive layer(s) 108 can be connected to the transparent display 102 over one or more components of the transparent display system 100, for example, over an adhesive layer, as described in further detail below. In some arrangements, the transparent display system 100 can include a touch-sensitive layer 108 connected to and external to the first side 104 or a touch-sensitive layer 108 connected to and external to the second side 106. In other arrangements, as shown in FIG. 1, the transparent display system 100 can include a first touch-sensitive layer 108A connected to and external to the first side 104 and a second touch-sensitive layer 108B connected to and external to the second side 106. The touch-sensitive layer(s) 108 can be formed from one or more substantially transparent materials, for example, glass and/or plastic and may use any suitable touch-sensitive technology, for example, electrical conductors formed from indium tin oxide (ITO), which in some instances, may not be substantially transparent, but may be formed from thin wires that have insignificant light absorption.

The transparent display system 100 also includes one or more heater layers 110. The heater layer(s) 110 are operable to generate heat to heat at least a portion of the transparent display system 100, including at least a portion of the transparent display 102. More specifically, the heater layer(s) 110 may be operated to generate heat based on the touch-based input received by the touch-sensitive layer(s) 108. For example, when a user of the transparent display system 100 touches the transparent display system 100, the heater layer(s) 110 may be operated to generate heat in the area touched by the user. The heater layer(s) 110 may be operable to locally generate heat in any suitable manner, for example, through Joule heating (resistive heating), and the heater layer(s) 110 may be formed from any suitable type of material configured to generate heat upon the application of electrical energy. For example, in some arrangements, as will be described in further detail below in connection with FIGS. 2A and 2B, the heater layer(s) 110 may be formed from one or more traces of indium tin oxide (ITO). Although ITO is not substantially transparent, the traces may be sufficiently thin such that the ITO has insignificant light absorption and does not substantially affect the transparency of the transparent display system 100. In other arrangements, as will be described in further detail below in connection with FIG. 2C, the heater layer(s) 110 may be formed from sections of polythiophene (PEDOT), formed as polythiophene pads 240, which may be substantially transparent. In other arrangements, the heater layer(s) 110 can be formed from any other suitable material, such as carbon nanotube hybrids.

The heater layer(s) 110 can be connected to the transparent display 102 external to the transparent display 102. The heater layer(s) 110 can be connected to the transparent display 102 under the touch-sensitive layer(s) 108, or the heater layer(s) 110 can be connected to the transparent display 102 over the touch-sensitive layer(s) 108, as shown. For example, the transparent display system 100 can include a heater layer 110 connected to the first side 104 over a touch-sensitive layer 108, or the transparent display system 100 can include a heater layer 110 connected to the second side 106 under a touch-sensitive layer 108. As shown in FIG. 1, the transparent display system 100 includes a first heater layer 110A connected to the first side 104 over the first touch-sensitive layer 108A and a second heater layer 110B connected to the second side 106 over the second touch-sensitive layer 108B. As mentioned above, the heater layer(s) 110 may be operable to locally generate heat according to a touch-based input received by the touch-sensitive layer(s) 108. For example, a touch-based input received by the first touch-sensitive layer 108A may be configured to operate the first heater layer 110A, and a touch-based input received by the second touch-sensitive layer 108B may be configured to operate the second heater layer 110B. In other examples, a touch-based input received by the first touch-sensitive layer 108A may be configured to operate the second heater layer 110B, and a touch-based input received by the second touch-sensitive layer 108B may be configured to operate the first heater layer 110A.

The transparent display system 100 also includes one or more adhesive layers 112. The adhesive layer(s) 112 can be configured to connect one or more of the components of the transparent display system 100. For example, as shown, the transparent display system 100 can include a first adhesive layer 112A configured to connect the first heater layer 110A to the first touch-sensitive layer 108A and a second adhesive layer 112B configured to connect the second heater layer 110B to the second touch-sensitive layer 108B. The transparent display system 100 can also include adhesive layer(s) 112 configured to connect the touch-sensitive layer(s) 108 to the transparent display 102, as well as other adhesive layer(s) 112 configured to connect the other components of the transparent display system 100. The adhesive layer(s) 112 can include any suitable adhesive, for example, pressure-sensitive adhesive (PSA), and the adhesive layer(s) 112 can be substantially transparent (e.g., formed from clear epoxy, clear resin, etc.).

The transparent display system 100 also includes one or more outer layers 114. The outer layer(s) 114 can be transparent panels, such as glass panels. The outer layer(s) 114 may be configured to cover, seal, protect, and/or enclose the components of the transparent display system 100. The outer layer(s) 114 may be connected to the transparent display 102 over the touch-sensitive layer(s) 108, the heater layer(s) 110, and/or the adhesive layer(s) 112, and can include a first outer layer 114A connected to the first heater layer 110A and a second outer layer 114B connected to the second heater layer 110B. In some arrangements, the outer layer(s) 114 can be components typical of windows such as window panes. The outer layer(s) 114 can be connected to the heater layer(s) 110 using one or more adhesive layer(s) 112.

With continued reference to FIG. 1, in the top-down direction of the illustrated horizontal orientation, the transparent display system 100 includes the first outer layer 114A, the first heater layer 110A, the first adhesive layer 112A, the first touch-sensitive layer 108A, the transparent display 102, the second touch-sensitive layer 108B, the second adhesive layer 112B, the second heater layer 110B, and the second outer layer 114B. However, the aforementioned components of the transparent display system 100 may be arranged in any suitable configuration. For example, the heater layer(s) 110 may be located between the touch-sensitive layer(s) 108 and the transparent display 102. The transparent display system 100 may also include one or more processors 116, a memory 118, and a control module 120, which together may form a computing device 130 configured to orchestrate operation of the transparent display system 100, as will be described in further detail below.

Figures 2A, 2B, 2C:
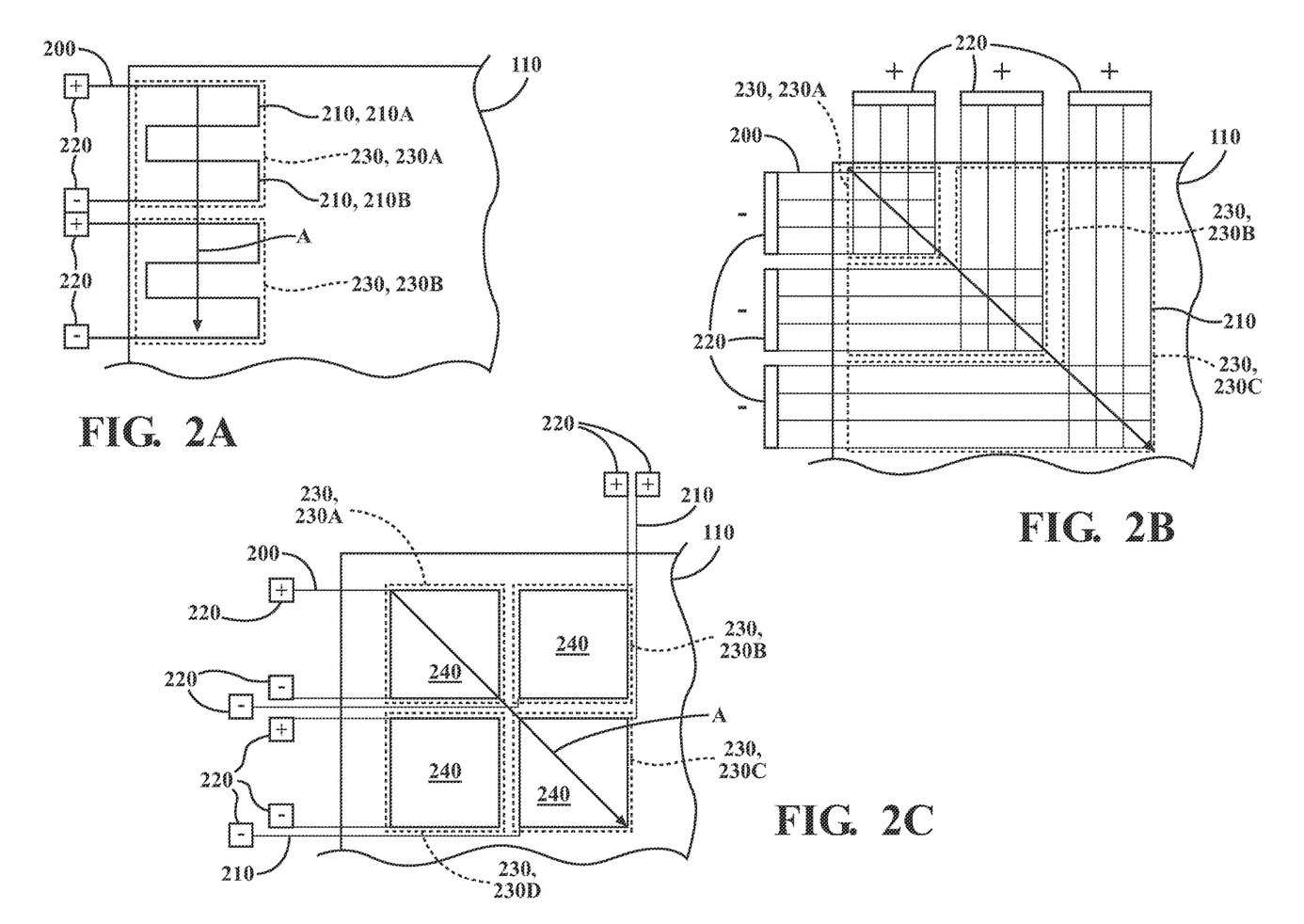
FIG. 2A is a first example of a heater layer including heat pixels in which each heat pixel is formed from a single trace.
FIG. 2B is a second example of a heater layer including heat pixels in which each heat pixel is formed from multiple traces.
FIG. 2C is a third example of a heater layer including heat pixels in which each heat pixel is formed from a polythiophene pad.

Referring now to FIGS. 2A-2C, various examples of the heater layer(s) 110 will now be described. In each example, each of the heater layer(s) 110 can include a trace array 200, including one or more traces 210, and one or more electrodes 220. The trace(s) 210 are configured in a serpentine fashion and electrically connected to the electrode(s) 220, which are operable to activate the trace array 200 to locally generate heat. As mentioned above, the trace(s) 210 can be formed from any material configured to generate heat upon application of electrical energy by the electrode(s) 220, for example, polythiophene (PEDOT), indium tin oxide (ITO), carbon nanotube hybrids, etc. The trace array 200 can be configured such that it is pixelated. In other words, the trace array 200 may form a grid of individually addressable heat pixels 230.

As shown in FIG. 2A, each heat pixel 230 may be formed using a single trace 210. FIG. 2A shows a first trace 210A forming a first heat pixel 230A and a second trace 210B forming a second heat pixel 230B. This arrangement may be useful for activating portions of the heater layer(s) 110 located near an edge of the heater layer(s) 110 and/or an edge of the transparent display 102 to generate heat. As shown in FIG. 2B, each heat pixel 230 may be formed using multiple traces 210 connected to each other. FIG. 2B shows a first heat pixel 230A, a second heat pixel 230B, and a third heat pixel 230C, each formed from multiple traces 210 connected to each other. The multiple traces 210 may each be functionally sized in width to balance the Joule heating across each heat pixel 230 for uniformly generating heat (e.g., for uniformly defrosting and/or defogging a window). This arrangement may be useful for activating increasingly larger areas of the heater layer(s) 110 to generate heat. As shown in FIG. 2C, each heat pixel 230 may be formed from a polythiophene pad 240 connected to one or more traces 210. FIG. 2C shows a first heat pixel 230A, a second heat pixel 230B, a third heat pixel 230C, and a fourth heat pixel 230D, each formed from a polythiophene pad 240. This arrangement may be useful for activating relatively smaller areas of the heater layer(s) 110 to locally generate heat. In any of the aforementioned arrangements, the heat pixel(s) 230 may be configured for individual activation according to the touch-based input. More specifically, the electrode(s) 220 may be operated according to the touch-based input to activate the heat pixel(s) 230 to generate heat.

When a user touches the transparent display system 100, the user may perform any type of touching gesture, for example, the user may tap the transparent display system 100, swipe across the transparent display system 100, etc. Accordingly, with additional reference to FIGS. 3A and 3B, the touch-based input may be a tapping gesture (FIG. 3A), a swiping gesture (FIG. 3B), or any other type of gesture. When the touch-based input is a tapping gesture, the electrode(s) 220 are operated to activate the heat pixel(s) 230 associated with the portion of the transparent display system 100 that received the tapping gesture. Similarly, when the touch-based input is a swiping gesture, the electrode(s) 220 are operated to activate the heat pixel(s) 230 associated with the portion of the transparent display system 100 that received the swiping gesture.

For example, referring to FIG. 2A, when a user taps the transparent display system 100 in an area corresponding to the first heat pixel 230A, the electrode(s) 220 connected to the first heat pixel 230A may be operated to activate the first heat pixel 230A to generate heat. Similarly, if a user taps the transparent display system 100 in an area corresponding to the second heat pixel 230B, the electrode(s) 220 connected to the second heat pixel 230B may be operated to activate the second heat pixel 230B to generate heat. In another example, a user can swipe across the transparent display 102 in a direction along the arrow A in order to activate, in order, the first heat pixel 230A and the second heat pixel 230B.

In another example, referring to FIG. 2B, when a user taps the transparent display system 100 in an area corresponding to the first heat pixel 230A, the electrode(s) 220 connected to the first heat pixel 230A may be operated to activate the first heat pixel 230A to generate heat. As shown, the first heat pixel 230A is generally square-shaped. When a user taps the transparent display system 100 in an area corresponding to the second heat pixel 230B, the electrode(s) 220 connected to the second heat pixel 230B may be operated to activate the second heat pixel 230B to generate heat. As shown, the second heat pixel 230B is generally shaped like a backwards L. When a user taps the transparent display system 100 in an area corresponding to the third heat pixel 230C, the electrode(s) 220 connected to the third heat pixel 230C may be operated to activate the third heat pixel 230C to generate heat. Like the second heat pixel 230B, the third heat pixel 230C, as shown, is generally shaped like a backwards L. Accordingly, in another example, a user may swipe across the transparent display 102 in a direction along the arrow A in order to activate, in order, the first heat pixel 230A, the second heat pixel 230B, and the third heat pixel 230C. Doing so would activate the electrodes 220 to activate each of the heat pixels 230A, 230B, and 230C in subsequent order to heat increasingly larger areas of the transparent display 102.

In another example, referring to FIG. 2C, when a user taps the transparent display system 100 in an area corresponding to the first heat pixel 230A, the electrode(s) 220 connected to the first heat pixel 230A may be operated to activate the first heat pixel 230A to generate heat. When a user taps the transparent display system 100 in an area corresponding to the second heat pixel 230B, the electrode(s) 220 connected to the second heat pixel 230B may be operated to activate the second heat pixel 230B to generate heat. When a user taps the transparent display system 100 in an area corresponding to the third heat pixel 230C, the electrode(s) 220 connected to the third heat pixel 230C may be operated to activate the third heat pixel 230C to generate heat. When a user taps the transparent display system 100 in an area corresponding to the fourth heat pixel 230D, the electrode(s) 220 connected to the fourth heat pixel 230D may be operated to activate the fourth heat pixel 230D to generate heat. In another example, a user can swipe across the transparent display 102 in a direction along the arrow A in order to activate, in order, the first heat pixel 230A, the second heat pixel 230B and the third heat pixel 230C, and the fourth heat pixel 230D. In the above-described examples related to FIGS. 2A-2C, the user is not limited to swiping the transparent display 102 along the arrow A, but may swipe in any other suitable direction to activate the heat pixels 230. In such a case, a single finger, a group of fingers, or an entire hand might be used to provide the touch-based input.

Figure 3A:
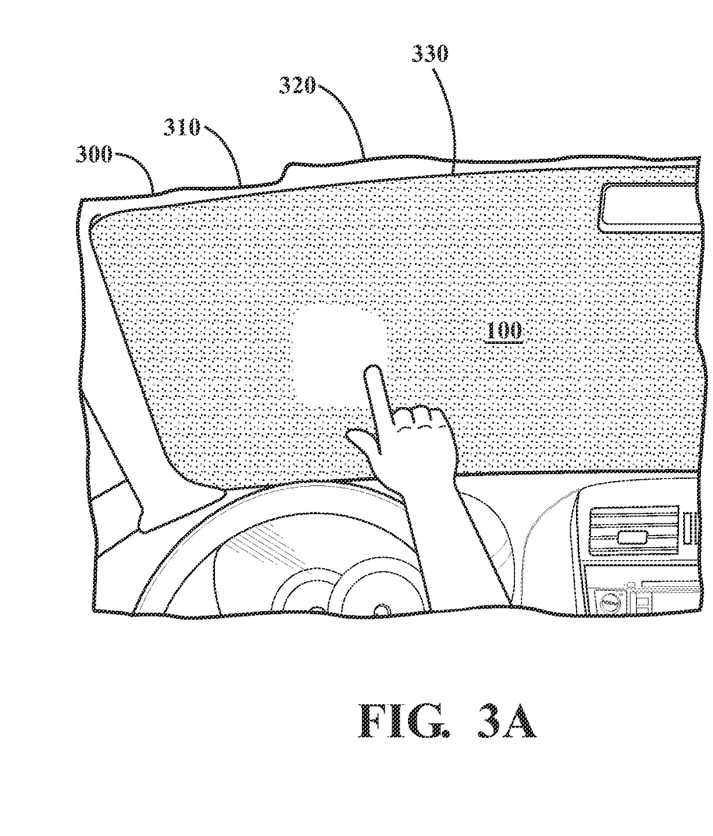
FIG. 3A is a first example of a vehicle window including a transparent display system in which the heater layer(s) are used to defrost or defog a portion of the window in response to a tapping gesture on the window.
Figure 3B:
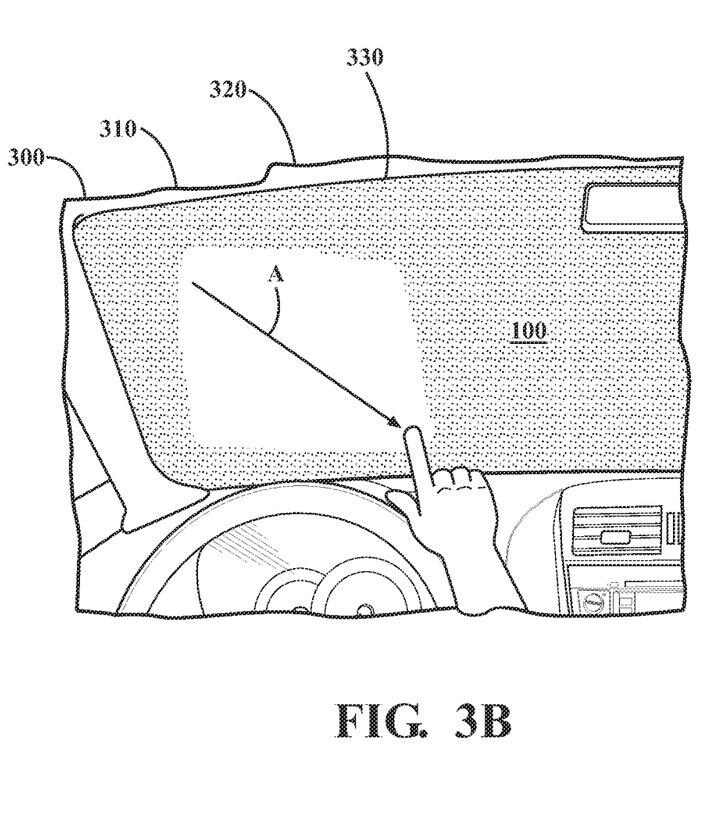
FIG. 3B is a second example of a vehicle window including a transparent display system in which the heater layer(s) are used to defrost or defog a portion of the window in response to a swiping gesture on the window.

Referring now to FIGS. 3A and 3B, various examples of use of the transparent display system 100 in connection with a vehicle 300 are shown. The vehicle 300 can include a vehicular body structure 310 defining a window frame 320. The vehicle 300 can also include a window 330 configured for installation to the window frame 320. As shown, the window 330 is a windshield, but the window 330 can be a side window, a rear window, a service window on a commercial vehicle, or any other type of window. The transparent display system 100 can form at least a portion of the window 330, and, with the transparent display 102 forming a core of the window 330, the first side 104 can be an inside of the window 330 and the second side 106 can be an outside of the window 330 about the transparent display 102. In these examples, the transparent display system 100 can include a touch-sensitive layer 108 connected to the first side 104 (e.g., connected to the inside of the window 330) and a heater layer 110 connected to the second side 106 (e.g., connected to the outside of the window 330). Accordingly, the touch-sensitive layer 108 can be configured to receive a touch-based input from an occupant of the vehicle 300 and heat the outside of the window 330 according to the touch-based input. As shown, the transparent display system 100 may be used to defrost or defog at least a portion of the window 330. For example, as shown in FIG. 3A, when the window 330 is touched using a tapping gesture, the heat pixel(s) 230 in the area where the window 330 was tapped may be activated to generate heat to defrost or defog that portion of the window 330. In another example, as shown in FIG. 3B, when the window 330 is touched using a swiping gesture along the arrow A, the heat pixel(s) 230 in the area where the window 330 was swiped may be activated to generate heat to defrost or defog that portion of the window 330.

Figure 4:
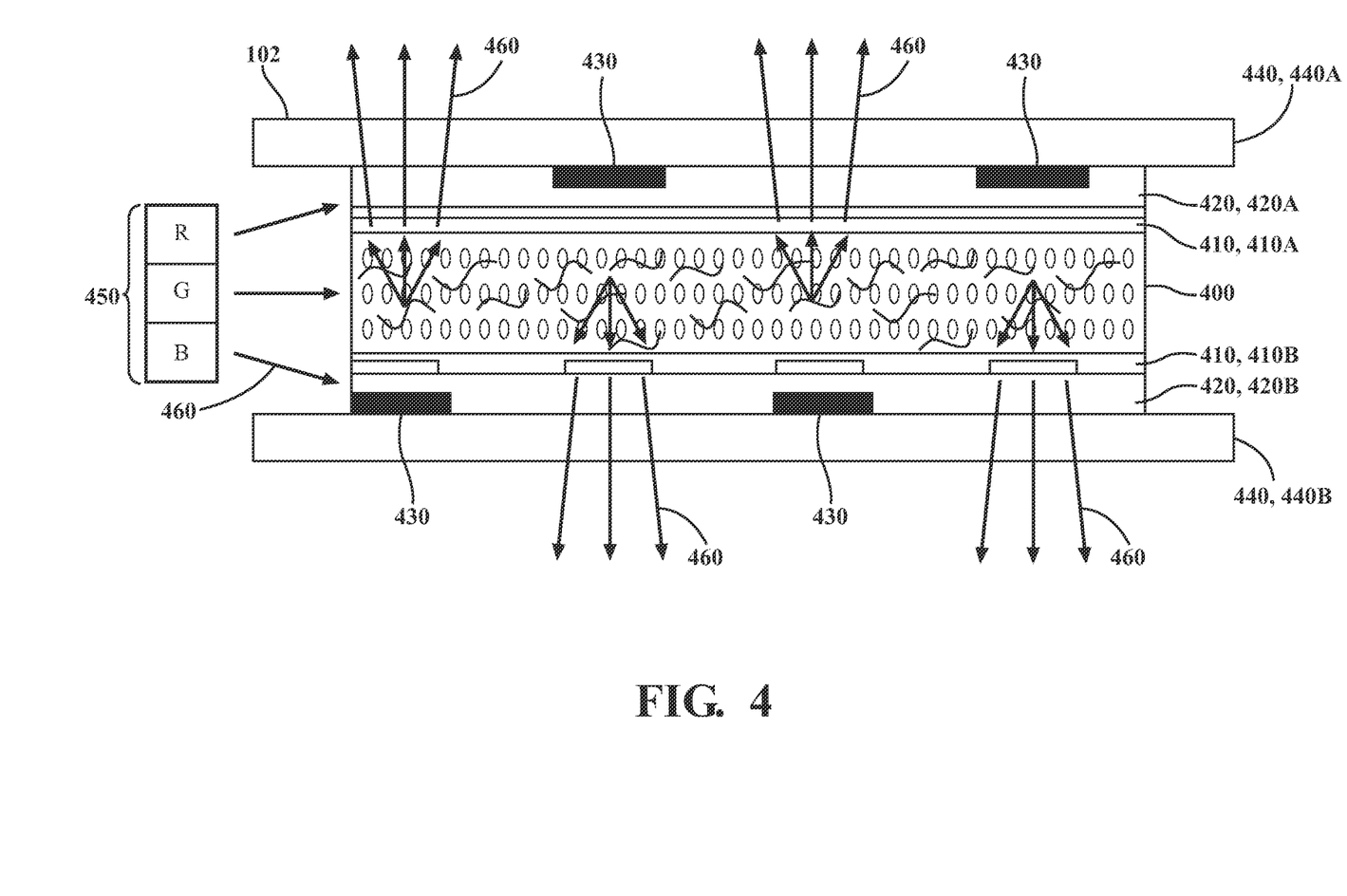
FIG. 4 is an example of a transparent display of the transparent display system.

Referring now to FIG. 4, a representative example of a transparent display 102 will now be described. The transparent display 102 includes one or more components configured to display content on the first side 104 and/or the second side 106 of the transparent display system 100 to a user of the transparent display system 100. Among other components, the transparent display 102 includes a liquid crystal layer 400, one or more electrode layers 410, one or more polyimide layers 420, one or more masks 430, and one or more outer layers 440, one or more of which can be formed using one or more substantially transparent materials so that the transparent display 102 is substantially transparent. The transparent display 102 also includes one or more light sources 450 configured to project light 460 along the liquid crystal layer 400 such that it is reflected out of the transparent display 102 (e.g. out of the first side 104 and/or the second side 106) for viewing by a user of the transparent display 102. The light source(s) 450 are RGB light sources and can include lasers, light-emitting diodes (LEDs), or any other suitable type of light source configured to project visible light 460.

The liquid crystal layer 400 is located between the first side 104 and the second side 106 and can be formed from any suitable type of liquid crystal, for example, polymer-dispersed liquid crystal. The liquid crystal layer 400 can be configured for anisotropic alignment within the liquid crystal matter for inducing light scattering. The liquid crystal layer 400 can have a molecular configuration that may be oriented in an ON state or an OFF state. In the ON state, the liquid crystal layer 400 allows light 460 from the light source(s) 450 to be scattered out of the first side 104 and/or the second side 106 and be visible to a user looking at the transparent display 102. In the OFF state, the liquid crystal layer 400 prevents light 460 from the light source(s) 450 from being scattered out of the transparent display 102.

The electrode layer(s) 410 can include a first electrode layer 410A and a second electrode layer 410B and can be located on either side of and attached to the liquid crystal layer 400. The electrode layer(s) 410 can be configured to activate the liquid crystal layer 400. The electrode layer(s) 410 can be formed from any suitable material, for example, indium tin oxide (ITO). Thin films of ITO can be utilized for this purpose. The polyimide layer(s) 420 can include a first polyimide layer 420A and a second polyimide layer 420B. The first polyimide layer 420A and the second polyimide layer 420B can be located on either side of and attached to the electrode layer(s) 410. The polyimide layer(s) 420 are configured as one or more alignment layer(s) for the liquid crystal layer 400. For example, the polyimide layer(s) 420 are configured to orient the liquid crystal layer 400 in the ON state or the OFF state. The mask(s) 430 can be any suitable type of mask configured to prevent light 460 from exiting the transparent display 102 in an unintended direction. For example, the mask(s) 430 can be black masks. Accordingly, the mask(s) 430 may not be transparent (e.g., they may be opaque), such that they block the transmission of light 460. The outer layer(s) 440, like the outer layer(s) 114 of FIG. 1, can be transparent panels, such as glass panels. The outer layer(s) 440 may be connected to the transparent display 102 and may be configured to cover, seal, protect, and/or enclose the components of the transparent display 102. The outer layer(s) 440 can include a first outer layer 440A connected to the first polyimide layer 420A and a second outer layer 440B connected to the second polyimide layer 420B.

While one example of a transparent display is described above, other types of transparent displays may be used. Other types of transparent display technology can include any of those disclosed in U.S. Pat. App. Pub. No. 2021/0389615A1, U.S. patent application Ser. Nos. 17/343,824, 17/348,126, 17/348,254 17/536,753, 17/536,821, which are incorporated herein by reference in their entireties.

Referring back to FIG. 1, as mentioned above, the transparent display system 100 can include a computing device 130, one or more processors 116, a memory 118, and a control module 120. The processor(s) 116, the memory 118, and the control module 120 together serve as the computing device 130 whose control module 120 orchestrates the operation of the transparent display system 100, including but not limited to the operation of the heater layer(s) 110. The control module 120 can be configured to detect a touch-based input to the transparent display system 100. For example, the control module 120 can be configured to detect a tapping gesture or a swiping gesture to the transparent display system 100 using the touch-sensitive layer(s) 108. Based on the detected touch-based input, the control module 120 can be configured to operate one or more components of the transparent display system 100.

For example, the control module 120 can operate the electrode(s) 220 to activate the trace array 200 to generate heat to heat at least a portion of the transparent display system 100. More specifically, when the control module 120 detects a tapping gesture to the transparent display system 100, the control module 120 can be configured to operate the electrode(s) 220 to activate the heat pixel(s) 230 associated with the area of the transparent display system 100 that received the tapping gesture. Similarly, when the control module 120 detects a swiping gesture to the transparent display system 100, the control module 120 can be configured to operate the electrode(s) 220 to activate the heat pixel(s) 230 associated with the area of the transparent display system 100 that received the swiping gesture.

The control module 120 may be a global control module. Relatedly, as part of a central control system, the transparent display system 100 may include a global control unit (GCU) with which the control module 120 is communicatively connected. Alternatively, the control module 120 may be a global control module. Relatedly, as part of a central control system, the transparent display system 100 may include a global control unit (GCU) to which the control module 120 belongs. Although the transparent display system 100, as shown, includes one control module 120, it will be understood that this disclosure is applicable in principle to otherwise similar transparent display systems including multiple control modules.

The processor(s) 116 may be any components configured to execute any of the processes described herein or any form of instructions to carry out such processes or cause such processes to be performed. The processor(s) 116 may be implemented with one or more general-purpose or special-purpose processors. Examples of suitable processors include microprocessors, microcontrollers, digital signal processors, or other forms of circuitry that execute software. Other examples of suitable processors include, without limitation, central processing units (CPUs), array processors, vector processors, digital signal processors (DSPs), field-programmable gate arrays (FPGAs), programmable logic arrays (PLAs), application-specific integrated circuits (ASICs), programmable logic circuitry, or other controllers.

The processor(s) 116 may include at least one hardware circuit (e.g., an integrated circuit) configured to carry out instructions contained in program code. In arrangements where there are multiple processor(s), the processor(s) may work independently from each other or in combination with one another. The memory 118 may be a non-transitory computer-readable medium. The memory 118 may include volatile or nonvolatile memory, or both. Examples of suitable memory include random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination of these. The memory 118 includes stored instructions in program code. Such instructions are executable by the processor(s) 116 or the control module 120. The memory 118 may be part of the processor(s) 116 or the control module 120 or may be communicatively connected to the processor(s) 116 or the control module 120.

Generally speaking, the control module 120 includes instructions that may be executed by the processor(s) 116. The control module 120 may be implemented as computer-readable program code that, when executed by the processor(s) 116, execute one or more processes described herein. Such computer-readable program code may be stored in the memory 118. The control module 120 may be part of the processor(s) 116 or may be communicatively connected to the processor(s) 116.

Now that the various potential systems, devices, elements, and/or components of the transparent display system 100 have been described, a method 500 for operating the transparent display system 100, including various possible steps of such method, will now be described. The method 500 described may be applicable to the arrangements described above, but it is to be understood that the method 500 can be carried out with other suitable systems and arrangements. Moreover, the method 500 may include other steps not shown here, and the method 500 is not limited to including every step shown. The blocks illustrated here as part of the method 500 are not limited to the particular chronological order. Indeed, some of the blocks may be performed in a different order than what is shown and/or at least some of the blocks can occur simultaneously.

Figure 5:
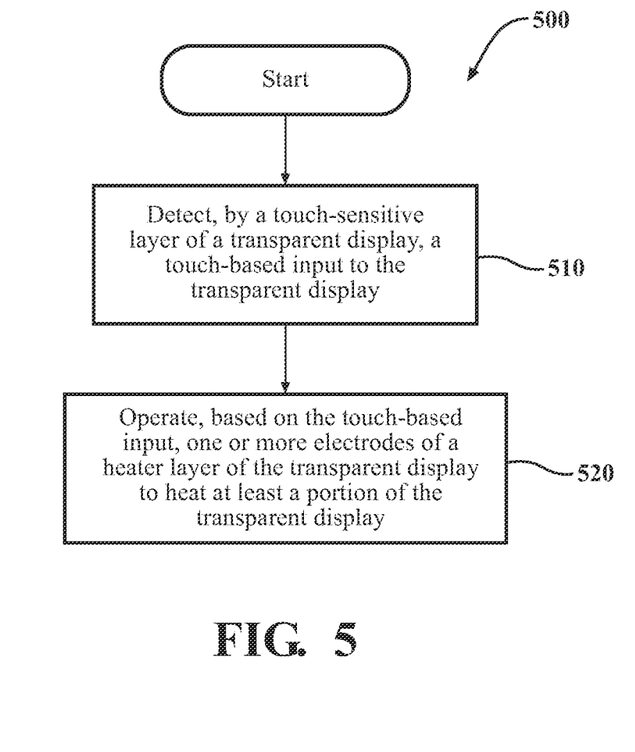
FIG. 5 is an example of a method of operating the transparent display system.

Referring to FIG. 5, an example of the method 500 is shown. The method 500 may begin at operation 510. In operation 510, the computing device 130 can detect a touch-based input to the transparent display 102. For example, the computing device 130 can detect, using the touch-sensitive layer(s) 108, a tapping gesture on the transparent display system 100 or a swiping gesture on the transparent display system 100. The method 500 can continue to operation 520. In operation 520, based on the touch-based input, the computing device 130 can operate the electrode(s) 220 to activate the trace array 200 to heat at least a portion of the transparent display system 100. More specifically, the computing device 130 can operate the electrode(s) 220 to activate the heat pixel(s) 230 to heat at least a portion of the transparent display system 100. For example, when the touch-based input is a tapping gesture, the computing device 130 can be configured to operate the electrode(s) 220 to activate the heat pixel(s) 230 associated with the area where the tapping gesture was received. In another example, when the touch-based input is a swiping gesture, the computing device 130 can be configured to operate the electrode(s) 220 to activate the heat pixel(s) 230 associated with the area where the swiping gesture was received.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A transparent display system, comprising:
a transparent display;
a touch-sensitive layer connected to the transparent display and configured to detect a touch-based input to the transparent display; and a heater layer connected to the transparent display, the heater layer comprising a trace array and one or more electrodes operable to activate the trace array, the trace array forming a grid of heat pixels configured for individual activation according to the touch-based input to generate heat to heat at least a portion of the transparent display.

2. The transparent display system of claim 1, wherein the transparent display forms at least a portion of a window, and wherein the trace array is configured for activation to heat a portion of the transparent display to defrost or defog a portion of the window.

3. The transparent display system of claim 1, wherein the transparent display forms at least a portion of a vehicle window, wherein the touch-sensitive layer is connected to an inside of the vehicle window, and wherein the heater layer is connected to an outside of the vehicle window.

4. The transparent display system of claim 1, wherein each heat pixel is configured for individual activation according to the touch-based input to heat a portion of the transparent display that received the touch-based input.

5. The transparent display system of claim 4, wherein the touch-based input is a tapping gesture, and wherein the one or more electrodes are operable to activate one or more heat pixels associated with the portion of the transparent display that received the tapping gesture.

6. The transparent display system of claim 4, wherein the touch-based input is a swiping gesture, and wherein the one or more electrodes are operable to activate one or more heat pixels associated with the portion of the transparent display that received the swiping gesture.

7. The transparent display system of claim 4, wherein one or more of the heat pixels are formed from a single trace.

8. The transparent display system of claim 4, wherein one or more of the heat pixels are formed from a plurality of traces.

9. The transparent display system of claim 4, wherein one or more of the heat pixels are formed from a polythiophene pad.

10. A vehicular body structure, comprising:
a window frame;
a window configured for installation in the window frame; and
a transparent display system forming at least a portion of the window, the transparent display system comprising:
a transparent display;
a touch-sensitive layer connected to the transparent display and configured to detect a touch-based input to the transparent display; and
a heater layer connected to the transparent display, the heater layer comprising a trace array and one or more electrodes operable to activate the trace array, the trace array forming a grid of heat pixels configured for individual activation according to the touch-based input to generate heat to heat at least a portion of the transparent display.

11. The vehicular body structure of claim 10 wherein the trace array is configured for activation to heat a portion of the transparent display to defrost or defog a portion of the window.

12. The vehicular body structure of claim 10, wherein the transparent display forms at least a portion of a vehicle window, wherein the touch-sensitive layer is connected to an inside of the vehicle window, and wherein the heater layer is connected to an outside of the vehicle window.

13. The vehicular body structure of claim 10, wherein each heat pixel is configured for individual activation according to the touch-based input to heat a portion of the transparent display that received the touch-based input.

14. The vehicular body structure of claim 13, wherein the touch-based input is a tapping gesture, and wherein the one or more electrodes are operable to activate one or more heat pixels associated with the portion of the transparent display that received the tapping gesture.

15. The vehicular body structure of claim 13, wherein the touch-based input is a swiping gesture, and wherein the one or more electrodes are operable to activate one or more heat pixels associated with the portion of the transparent display that received the swiping gesture.

16. The vehicular body structure of claim 13, wherein one or more of the heat pixels are formed from one or more traces.

17. The vehicular body structure of claim 13, wherein one or more of the heat pixels are formed from a polythiophene pad.

18. A method of heating a window, the window comprising a transparent display system forming at least a portion of the window, the transparent display system comprising a transparent display, a touch-sensitive layer connected to the transparent display, and a heater layer connected to the transparent display, the heater layer comprising a trace array and one or more electrodes, the trace array forming a grid of heat pixels configured for individual activation, the method comprising:
detecting, by the touch-sensitive layer, a touch-based input to the transparent display; and
operating, based on the touch-based input, the one or more electrodes to activate the trace array to heat at least a portion of the transparent display.

19. The method of claim 18, wherein the trace array forms a grid of heat pixels, wherein detecting a touch-based input includes detecting a tapping gesture on the transparent display, and wherein operating the one or more electrodes includes operating one or more electrodes connected to one or more heat pixels located in an area associated with the tapping gesture to activate the one or more heat pixels to generate heat to defrost or defog a portion of the window.

20. The method of claim 18, wherein the trace array forms a grid of heat pixels, wherein detecting a touch-based input includes detecting a swiping gesture on the transparent display, and wherein operating the one or more electrodes includes operating one or more electrodes connected to one or more heat pixels located in an area associated with the swiping gesture to activate the one or more heat pixels to generate heat to defrost or defog a portion of the window.

* * * * *